3,770,659
AUTO EMISSIONS CATALYST
Lee A. Cosgrove, Westchester, and James E. McEvoy, Springfield, Pa., assignors to Air Products and Chemicals, Inc., Wayne, Pa.
No Drawing. Filed Oct. 1, 1971, Ser. No. 185,906
Int. Cl. B01j 11/06, 11/08
U.S. Cl. 252—465     2 Claims

ABSTRACT OF THE DISCLOSURE

The active catalyst for burning pollutants exhausted from an internal combustion engine consists essentially of sorptive alumina matrix, from about 5 to about 18 weight percent manganese monoxide, from about 2 to about 8 weight percent chromium sesquioxide, and from about 0.01 to about 0.2 weight percent palladium, the unit weight ratio of manganese monoxide to chromium sesquioxide being greater than about 2 and less than about 3.5, and the total weight of such 2 oxides being from about 8 to about 24%.

BACKGROUND OF THE INVENTION

(1) Field of the invention

This invention relates to treatment of waste gases from an internal combustion engine and to catalysts comprising oxides of metals of Groups III, VI, VII, and VIII.

(2) Description of the prior art

Catalytic mufflers for the combustion of pollutants from an internal combustion engine have been investigated for several years and they have been used in those environments where extreme need existed for pollution control. Although catalytic mufflers benefit the general public, the owner of an automobile having a catalytic muffler has little personal benefit therefrom so that the usage arises primarily from compulsion. Legislators have been reluctant to burden auto owners with the great expense of catalytic mufflers except when they were convinced that the financial burden was matched by balancing benefits to the public. Because cost effectiveness has been a critical issue, environmental scientists have encouraged development of an effective auto emissions catalyst at a lower cost.

Briggs et al., 3,295,918 describes an auto emissions catalyst comprising up to 12 weight percent copper oxide and modified by the presence of a manganese dioxide and chromic oxide and palladium on an alumina matrix. Stiles, 3,265,637 recommends a supported mixture of mangano chromium manganite particles having different manganese to chromium atom ratios for use as an auto emissions catalyst. Talsma, 3,397,154 describes the preparation of gray oxide of alumina by the partial oxidation of aluminum and suggests a significant variety of metallic and/or metal oxide components for impregnation into the unique alumina. Koepernik, 3,310,366 describes preparation of an alumina support by gel formation, drying, grinding, peptizing in diluted acetic acid, extruding, drying, and calcining to provide sorptive alumina product particles suitable for impregnation with compounds promoting combustion of exhaust gases. These and other literature items indicate that a large sum has been devoted to research on auto emissions catalyst without satisfactorily solving some of the problems.

SUMMARY OF THE INVENTION

In accordance with the present invention, the exhaust gas from an internal combustion engine is burned in the presence of a catalytic component consisting essentially of a sorptive alumina matrix, from about 5 to about 18 weight percent manganese monoxide, from about 2 to about 8 weight percent chromium sesquioxide, and from about 0.01 to about 0.2% palladium, the unit ratio of Mn atoms to Cr atoms being greater than about 2 and less than about 3.5. A preferred embodiment of such a catalytic component may be prepared by the impregnation of a sorptive alumina matrix with an aqueous solution containing a soluble manganese salt, a soluble chromium salt, and a soluble palladium salt, and by the drying and heating of the impregnated alumina at a temperature decomposing the anions of the salt to deposit metal oxides in the sorptive alumina. Spheroids, pellets, fluidizable particles, monoliths, and coatings upon structural components are examples of catalytic components in the various types of catalytic combustion devices for burning pollutants exhausted from internal combustion engines.

DESCRIPTION OF PREFERRED EMBODIMENTS

The invention is further clarified by reference to a plurality of examples.

Example I

A block of gamma alumina was prepared so that it featured a plurality of tubular holes longitudinally extending through the block to provide a monolithic support for an auto emissions catalyst. The volume of the gamma alumina block was 41.5 cc., and its weight was 33.2 grams. The average pore volume was about 0.54 cc. per gram. An impregnating solution was prepared by mixing 502 grams of 50% manganese nitrate solution, 59.4 grams of ammonium dichromate crystals and 10.6 cc. of palladium nitrate solution (containing 0.1 gram Pd/cc.) and sufficient water to provide 600 cc. of impregnating solution. The solution was divided into five portions of 110 cc. each. During a period of seven minutes, a monolithic catalyst support was dipped slowly into the immersing solution and the block was allowed to soak for one hour. The impregnated monolithic carrier was dried for two hours at 220° F. Each catalyst body was heated to about 600° C. thereby decomposing and volatilizing nitrate and ammonium salts to provide a metal oxide on alumina carrier. Each catalyst body consisted predominantly of sorptive alumina, 9.4% MnO, 3.38% $Cr_2O_3$, and 0.1% Pd, and the unit weight ratio of $MnO/Cr_2O_3$ was 2.78 and the total of MnO and $Cr_2O_3$ was 12.78%. Each catalyst was tested as an auto emissions catalyst and found to be effective in the burning of carbon monoxide, hydrocarbons, and other pollutants in the exhaust gas. In the standard test for combustion of the standard synthetic mixture the temperature for 50% combustion of the CO was 400° F. and the temperature for 50% combustion of the hydrocarbon was 446° F.

Example II

An impregnating solution contained 3.664 kilograms of 50% manganese nitrate solution containing about 19.8% manganous oxide. The solution also contained 0.435 kilogram of ammonium dichromate $(NH_4)_2Cr_2O_7$. The solution also contained 78 cc. of a solution of palladium nitrate containing 100 grams of palladium per liter. Sufficient water was prvoided to amount to 4.8 liters of solution. A batch of 6.93 kilograms (11 liters) of alumina spheroids (about 2–4 mm. diameter) was impregnated by the no-excess procedure with the solution of manganous nitrate, ammonium chromate and palladium nitrate. The impregnated spheroids were transferred to a dryer and maintained at about 105° C. for about two hours. Thereafter, the dried spheroids were calcined at 400° C. to provide spheroidal catalyst particles which were effective as an auto emissions catalyst. By a series of tests it is established that the temperature at which the anions of the salts are thermally decomposed to deposit metal oxides in the sorptive alumina should desirably be from about 400° C. to about 800° C.

for a time from about 1 to about 4 hours. The catalyst contained 9.4% MnO, 3.4% $Cr_2O_3$, 0.1% Pd, and was predominantly $Al_2O_3$. The unit weight ratio of MnO/$Cr_2O_3$ was 2.76 and the total of MnO plus $Cr_2O_3$ was 12.8%.

The catalyst was employed to burn components in the exhaust from an automobile engine. The exhaust gas was analyzed both before and after catalytic treatment, the percentage reduction of pollutant being reported.

|  | 315° C. added air | | 426° C. added air | | 537° C. added air | |
|---|---|---|---|---|---|---|
|  | 0% | 5% | 0% | 5% | 0% | 5% |
| Percent reduction: | | | | | | |
| CO | 30 | 56 | 69 | 80 | 54 | 91 |
| HC | 10 | 21 | 49 | 53 | 54 | 71 |
| NO | 19 | 12 | 36 | 14 | 42 | 9 |

The catalyst was evaluated for its effectiveness in promoting combustion of a synthetic mixture consisting of 9.5% $CO_2$, 1.55% CO, 245 part per million of $C_3H_6$ (propylene), 2.8% $O_2$ (thus providing excess over combustion requirements), 10% $H_2O$, and balance $N_2$. The temperature at which 50% conversion was achieved was reported. The catalyst achieves the particularly important 50% conversion of hydrocarbons at the advantageously low temperature of 48° F. The corresponding temperature for 50% oxidation of CO is 419° F. A control catalyst which differed only in that palladium was omitted required temperatures of 581° F. and 740° F. for 50% combustion of the hydrocarbon and carbon monoxide respectively thus establishing the critical necessity for the palladium component. In another control, the catalyst contained, in addition to the same concentrations of manganese chromium, and palladium, the distinguishing feature of copper oxide in a 4% concentration. The 50% combustion temperatures for hydrocarbon and carbon monoxide for this control were 519° F. and 416° F. respectively, thus evidencing the adverse effect of CuO in a catalytic muffler similar to the present invention. Inasmuch as CuO has been employed in many catalytic mufflers, the advantageous superiority of the catalyst free from CuO was quite unobvious and surprising. Such results are shown in tabular form:

| | Catalyst composition | | | | $T_{50}$, °F. HC | $T_{50}$, °F. CO |
|---|---|---|---|---|---|---|
| | MnO | $Cr_2O_3$ | Pd | CuO | | |
| Control A | 9.4 | 3.4 | None | None | 581 | 740 |
| Control B | 9.4 | 3.4 | 0.1 | 4.0 | 519 | 416 |
| This invention | 9.4 | 3.4 | 0.1 | None | 488 | 419 |

The superiority and unobviousness of the present invention is indicated by the above table.

Example III

Catalytic mufflers sometimes feature a ceramic block having a plurality of parallel tubular holes longitudinally extending through the block. Such a monolithic ceramic structure is prepared from cordierite, whereby high temperature resistance and structural strength are achieved. The ceramic structure is absorbent but has less than 1 m.²/g. surface area. Each tubular passageway is lined with sorptive alumina by depositing an aqueous dispersion of finely divided hydrated alumina powder and thereafter heating the monolithic block to an elevated temperature. A solution of compounds of manganese, chromium, and palladium is impregnated into the sorptive alumina liners for the tubes, and thereafter heated in the 400–800° C. range to produce a block having a catalytic component consisting essentially of 75.8% sorptive alumina, 18% manganese monoxide, 6% chromium sesquioxide, and 0.2 weight percent palladium. The MnO/$Cr_2O_3$ unit weight ratio is 3 and the total weight of these two metal oxides is 24%. The catalytic component in the structure is the tube lining having the combination of the sorptive alumina matrix and the manganese oxide, chromium sesquioxide and palladium impregnated therein. The cordierite monolith serves merely as a structure for holding such catalytic component. The monolith comprising the catalytic component is effective for the combustion of pollutants exhausted from an internal combustion engine.

Example IV

An extrudable mixture is prepared consisting of ammonium chromate, manganese nitrate, palladium nitrate, alpha alumina trihydrate, alpha alumina monohydrate and water. The mixture is extruded into strands and sliced into pellets, which are heated one hour at 475° C., and cooled to provide catalyst pellets consisting of 6% manganese monoxide, 2.9% chromium sesquioxide, 0.1 weight percent palladium, and the balance sorptive alumina. The total weight of manganese monoxide plus chromium oxide is 8%, and the weight ratio of manganese monoxide to chromium sesquioxide is 2.1. The pellets are effective for promoting combustion of pollutants exhausted from an internal combustion engine.

Example V

A solution is prepared consisting of manganese nitrate, ammonium chromate, palladium nitrate, and aluminum nitrate. The pH of the solution is modified by the addition of concentrated ammonium hydroxide to co-precipitate the oxides of aluminum, manganese, chromium, and palladium. The thus formed gel is shaped into beads, which are calcined at 250° C. to provide spheroids of alumina matrix containing 6% manganese monoxide, 2.1 weight percent chromium sesquioxide, and 0.2 weight percent palladium. The particles are effective for burning pollutants exhausted from an internal combustion engine.

What is claimed is:

1. An emissions catalyst for burning pollutants exhausted from an internal combustion engine said catalyst being a catalytic component consisting essentially of sorptive alumina matrix, from about 5 to about 18 weight percent manganese monoxide, from about 2 to about 8 weight percent chromium sesquioxide and from 0.01 to about 0.2% palladium, the unit weight ratio of MnO/$Cr_2O_3$ being greater than about 2 and less than 3.5, and the total weight of MnO and $Cr_2O_3$ being within a range from about 8 to about 24%.

2. The catalyst of claim 1 in which the manganese monoxide is about 9%, the chromium sesquioxide is about 3%, and the palladium is about 0.1%.

References Cited
UNITED STATES PATENTS

| 3,316,057 | 4/1967 | Howk et al. | 252—465 X |
| 3,470,105 | 9/1969 | Briggs et al. | 252—465 X |
| 3,295,918 | 1/1967 | Briggs et al. | 252—466 Pt |
| 3,554,929 | 1/1971 | Aarons | 252—465 X |

DANIEL E. WYMAN, Primary Examiner

P. F. SHAVER, Assistant Examiner

U.S. Cl. X.R.

252—466 Pt